US006807430B2

(12) United States Patent
Woods et al.

(10) Patent No.: US 6,807,430 B2
(45) Date of Patent: Oct. 19, 2004

(54) PORTABLE COMMUNICATION DEVICE HAVING BACK-LIGHTING AND HIGH KEY PRESS NOISE MARGIN

(75) Inventors: Gregory Kent Woods, Ramona, CA (US); George Alan Wiley, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 299 days.

(21) Appl. No.: 10/060,992

(22) Filed: Jan. 29, 2002

(65) Prior Publication Data

US 2003/0144023 A1 Jul. 31, 2003

Related U.S. Application Data

(60) Provisional application No. 60/356,621, filed on Oct. 24, 2001.

(51) Int. Cl.[7] .................................................. H04B 1/38
(52) U.S. Cl. ........................ 455/550; 455/90; 455/525; 455/566; 345/102
(58) Field of Search .......................... 455/550, 90, 525, 455/566, 572, 573, 433.5, 158.9, 159.1, 556, 557; 345/102, 98, 94, 96

(56) References Cited

U.S. PATENT DOCUMENTS

| | | | | |
|---|---|---|---|---|
| 5,515,144 A | * | 5/1996 | Miyasaka et al. ............... 399/1 |
| 6,226,501 B1 | * | 5/2001 | Weadon et al. ........... 455/575.3 |
| 6,278,887 B1 | * | 8/2001 | Son et al. ..................... 455/566 |
| 6,424,844 B1 | * | 7/2002 | Lundqvist .................... 455/566 |
| 6,434,371 B1 | * | 8/2002 | Claxton ....................... 455/90.1 |
| 6,434,404 B1 | * | 8/2002 | Claxton et al. ........... 455/575.3 |
| 6,504,523 B1 | * | 1/2003 | Sugawara et al. ............. 345/98 |
| 6,587,700 B1 | * | 7/2003 | Meins et al. .............. 455/575.8 |
| 6,667,731 B2 | * | 12/2003 | Park ............................ 345/102 |

* cited by examiner

*Primary Examiner*—Pablo N. Tran
(74) *Attorney, Agent, or Firm*—Philip R. Wadsworth; Charles D. Brown; George C. Pappas

(57) ABSTRACT

A mobile communication device, and a method of reading key presses and backlighting a mobile communication device, are disclosed. The method of reading key presses and backlighting a mobile communication device includes providing a mobile communication device including a plurality of marked keys resident on a flip module separate from a main module, and switching, by the mobile communication device, between a first positive voltage to the flip module when the plurality of marked keys are backlit, and a first negative voltage when the plurality of marked keys are not backlit, according to a switch command from the main module. The mobile communication device includes a main module, a flip module electrically connected to the main module, wherein the flip module includes thereon a plurality of marked keys, and a voltage switch which places a first positive voltage on a two wire interface to allow for a reading of a pressed of at least one of the plurality of keys by the main module, and which places a first negative voltage on the two wire interface to prevent the reading of a pressed of at least one of the plurality of keys by the main module.

35 Claims, 4 Drawing Sheets

PORTABLE COMMUNICATION DEVICE HAVING BACK-LIGHTING AND HIGH KEY PRESS NOISE MARGIN

RELATED APPLICATIONS

This application claims priority to pending Provisional application No. 60/356,621, filed of Oct. 24, 2001, incorporated herein by reference.

BACKGROUND OF THE INVENTION

1. Field of the Invention

The present invention is directed generally to a method and apparatus for providing a voltage to a communication device and, more particularly, to a portable communication device having improved back-lighting and key-press noise margin.

2. Description of the Background

Portable communication devices, such as portable telephones, often include, for example, a main module, which main module often includes a personal digital assistant mainboard that performs the functions of portable telephone call receipt, call decoding, call sending, and encoding, as well as personal digital assistant functions, such as address books and paging. Portable communication devices additionally often include a flip module. The flip module generally opens outward from the main module, and regularly includes thereon a series of back-lit keys that, when pressed, cause the performance of various functions by the mainboard. The interface between the flip module and the main module may be, for example, a two-wire interface.

The two wire interface performs the function of carrying the voltage necessary to power the light-emitting diodes (LEDs) that may perform the backlighting on the flip module, and additionally performs the function of carrying the signal signifying the pressing of a particular key on the flip module to the mainboard. Upon receipt of this signal, the mainboard then carries out at least one of a series of functions, dependant upon which key or keys were pressed.

Thus, voltage has historically been placed on the two-wire interface in order to send voltage to, and receive voltage from, the flip module to perform the dual flip module functions of reading key presses and back-lighting. In general, a first voltage has been used to read key presses. This voltage is hereinafter referred to as the "key press voltage". A second, larger voltage has been used to perform backlighting. This is referred to as the "backlight voltage."

Due to the fact that the two voltages discussed hereinabove share the same 2-wire interface, only one voltage occupies the interface at any given time, in order to maintain separate operation of the key press and backlight functions. The prior art has thus sequenced the two voltages, connecting the backlight voltage to the interface by an electrical switch, and making the key press of high source impedance. When the switch is off, the interface defaults to the key press voltage. When the switch is on, the backlight voltage is on the interface, overriding the high source impedance of the key press voltage. In operation, the backlight voltage has historically been active substantially continuosly, except for periodic intervals of key press detection.

In order to prevent undesirable interaction between the key press circuitry and the LEDs, a switch is employed on the flip module to connect the LEDs to the 2-wire interface only upon receipt of the backlight voltage from the mainboard. Due to the fact that a low-cost Darlington switch topology used in the prior art had an inherently low threshold precision, the backlight voltage has historically been substantially higher than the maximum key press voltage to ensure proper operation of the LED switch. Backlight voltage is thus higher than key press voltage, to allow the LED switch to distinguish between the two voltages. In general, backlight voltage has historically been approximately 3.3 volts, and the key press voltage has been in the range of between 0 and approximately 1.6 volts.

Each key press has generally corresponded to a different voltage at the interface, and, thus the sum of the voltage ranges of all keys must be present within the 1.5 Volt range available as set forth hereinabove. Therefore, the probability of misreading a key has been unacceptably high, due to the very small range available to each key when a small voltage range, such as 1.5V, is used (if there are 20 keys, each key has a range of only 1.5V/20 keys, or 0.075V per key). Further, the key presses are much more susceptible to interference and noise, due to a low signal to noise ratio, than the key presses would be if a wider range was available to each key.

Further, a larger reduction in voltage on the interface, to insure that the LEDs were not seen by the mainboard, was often necessary due to the use of Darlington transistor switching to turn the LEDs off and on. Transistor switches preferably have well-defined on and off states. However, Darlington transistor circuits frequently suffer from uncertainty between on and off states, and thus large voltage changes are necessary to the LEDs on the flip module to insure that the Darlington switch is in the desired state.

Therefore, the need exists for a communication device that uses a two-wire voltage interface, but that additionally provides an improved signal to noise ratio for key presses, better isolates the backlighting voltage from the key press voltage, and that makes a larger voltage range available for both back-lighting and key press reading of the communication device.

BRIEF SUMMARY OF THE INVENTION

The present invention is directed to a mobile communication device. The mobile communication device includes a main module having a call receiver and a call sender, a keyboard module resident on a flip module separate from the main module, which keyboard module includes thereon a plurality of marked keys backlit by at least one light, a central processing unit which controls the activation of the at least one light, a two wire interface having a first voltage line and a second voltage line interconnecting the flip module and the main module, and a voltage switch which places a first positive voltage between the first voltage line and the second voltage line to allow for a reading of a pressed at least one of the plurality of keys by the central processing unit, and which places a first negative voltage between the first voltage line and the second voltage line of to activate the at least one light according to a command from the CPU. The main module may additionally include a main board that includes thereon the call sender and call receiver. The voltage switch preferably includes a keyboard flip module switch and a main board switch connected by said two wire interface.

The present invention also includes a method of reading key presses and backlighting a mobile communication device. The method includes providing a main module having a call receiver and a call sender, providing a keyboard module resident on a flip module separate from the main module, wherein the keyboard module includes thereon a plurality of marked keys, backlighting the plurality of keys by at least one light, controlling, by a central processing unit, of activation of the at least one light, interconnecting the flip module and the main module using a two wire interface having a first voltage line and a second voltage line, receiving a first switch command from the CPU, switching to a first positive voltage between the first voltage line and the second voltage line according to the receiving of a first switch command, receiving a second switch command from the CPU, switching to a first negative voltage between the first voltage line and the second voltage line according to the receiving of a second switch command, and activating the at least one light upon said switching to a first negative voltage. The method preferably further includes isolating the CPU from the backlighting step.

The present invention solves problems experienced with the prior art because it provides a mobile communication device that uses a two-wire voltage interface, but that additionally provides an improved signal to noise ratio for key presses, better isolates backlight voltage from key press voltage, and that makes a larger voltage range available for both back-lighting and key press reading of the communication device. Those and other advantages and benefits of the present invention will become apparent from the detailed description of the invention hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical communication device and system. Those of ordinary skill in the art will recognize that other elements are desirable and/or required in order to implement the present invention. However, because such elements are well known in the art, and because they do not facilitate a better understanding of the present invention, a discussion of such elements is not provided herein. Additionally, reference herein to "positive" or "negative" voltages denote only comparative voltages between reference points, and do not imply a specific absolute polarity.

Figure 1:
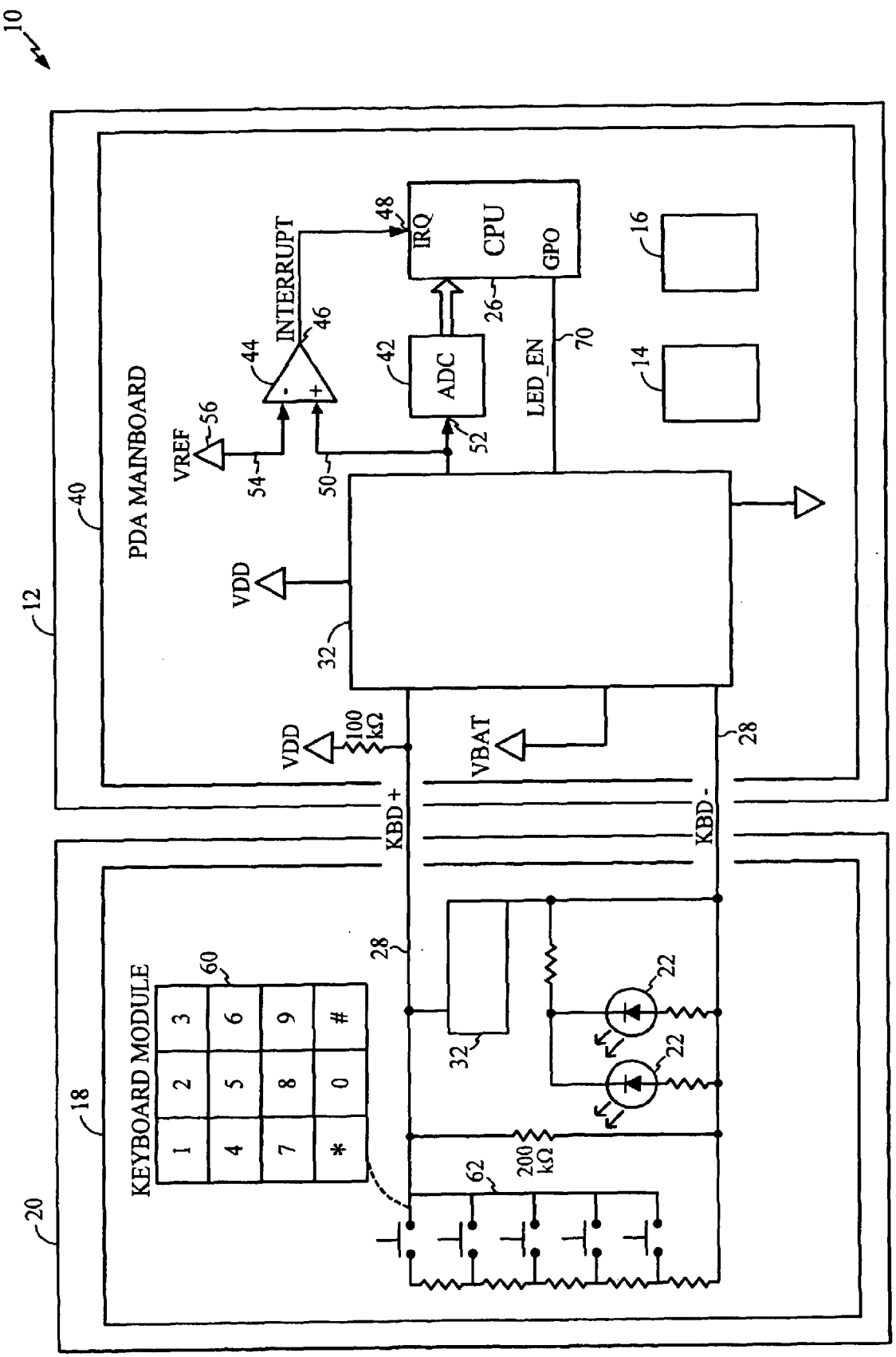
FIG. 1 is a block diagram illustrating a mobile communication device.

FIG. 1 is a block diagram illustrating a mobile communication device 10. The mobile communication device 10 may be, for example, a mobile telephone, such as a cellular telephone, in communication with a mobile telephone network (not shown). The mobile communication device 10 includes a main module 12 having a call receiver 14 and a call sender 16, a keyboard module 18 resident on a flip module 20 separate from the main module 12, at least one light 22 that back-lights the keyboard module 18, a central processing unit 26 which controls the activation of the at least one light 22, a two wire interface 28 that interconnects the flip module 20 and the main module 12, and a voltage switch 32 which places a first positive voltage on the two wire interface 28 to allow for a reading of a pressing of a keyboard key by the central processing unit 26, and which places a first negative voltage on the two wire interface 28 to activate the at least one light 22 according to a command from the CPU 26.

The main module 12 includes a call sender 16 and a call receiver 14. The call sender 16 and call receiver 14 may be capable of sending and receiving any type of call, such as, but not limited to, a telephone call, and IP telephony call, a page, a short message, packets sent or received over a wireless data network, or an IR communication from another device. The call sender 16 and call receiver 14 for a mobile communication device 10 are known to those skilled in the art. The main module 12 also preferably includes a main board 40, which may include thereon the call sender 16 and call receiver 14. The main board 40 may be, for example, a personal digital assistant (PDA) mainboard that performs the functions of portable telephone call receipt, call decoding, call sending, and encoding, as well as personal digital assistant functions, such as address book, paging, calendar, and organizational functions. Additionally, the mainboard 40 preferably includes thereon a central processing unit (CPU) 26, as discussed hereinbelow, an analog to digital converter (ADC) 42, and a comparator 44, the output 46 of which runs to an interrupt (IRQ) line 48 of the CPU 26, one input 50 of which runs to the ADC input 52, and the other input 54 of which runs to a reference voltage 56.

The keyboard module 18 is resident on a flip module 20 separate from the main module 12. The flip module 20 opens outward from the main module 12, and generally includes therein or thereon a plurality of back-lit keys 60 that, when individually pressed, cause the performance of various functions available on the mainboard, 40 as discussed hereinbelow. The keyboard module 18 includes a resistive ladder 62, which ladder 62 represents each of the individual keys 60 resident on the flip module 20 with a different resistance, as is known in the art. The resistive ladder 62 has connected thereto the plurality of keys 60 which, when individually pressed, place different resistive loads between voltages KBD plus and KBD minus. Thus, when a key 60 on the resistive ladder 62 is pressed, a key 60 on the keyboard flip module 20 has been activated, and a function must be performed by the CPU 26. The CPU 26 recognizes this by the change in analog voltage, as seen at the ADC 42, on KBD plus, due to the change in resistance on the resistive ladder 62. It will additionally be apparent to those skilled in the art that, dependent upon the characteristics of ADC 42, it may be desirable to add an amplifier buffer in series with the ADC 42 input, in order to overcome high input impedance of the keyboard circuit. The resistive ladder 62 is biased by the presence of a positive voltage from node KBD minus up to node KBD plus. Further, the keyboard module 18 preferably additionally includes thereon the light 22 or lights 22 that perform the back-lighting of the flip module 18.

The two wire interface 28 interconnects the flip module 20 and the main module 12, and includes a positive voltage line, KBD plus, and a negative voltage line, KBD minus. The two wire interface 28 carries the voltage necessary to power the light 22 or lights 22 that perform the backlighting on the flip module 20, and carries the signal signifying the pressing of a particular key 60 to the mainboard 40. Upon receipt of the key-press signal at the CPU 26 on the mainboard 40, the CPU 26 then causes to be carried out at least one function, which function is dependant upon which key 60 or keys 60 were pressed.

The voltage switch 32 is communicatively connected to the two-wire interface 28. The voltage switch 32 causes the placement of a positive voltage from the positive voltage line KBD plus down to the negative voltage line KBD minus in order to read a key press according to the CPU 26, and causes the placement of a negative voltage from the positive voltage line KBD plus down to the negative voltage line KBD minus in order to activate the at least one light 22 according to the CPU 26. The switching of the voltages on the KBD lines is preferably controlled by the CPU 26 through an activation and deactivation of a CPU output line 70, such as an LED enable line. The switching carried out by the CPU 26 may be performed, for example, by a CPU multiplying routine resident on the CPU 26, to thereby allow the voltage switch 32 to cycle on (i.e. KBD+ is low), thus activating the at least on light 22, and off (i.e. KBD+ is high), thus allowing a key-press reading by the CPU 26. In a preferred embodiment, the lighting is cycled on the majority of the time. The switching of voltage polarity, rather than a reduction in voltage, to perform switching, allows for the use of the full voltage range available for both the lighting and the key press ladder biasing, thus improving the noise margin for key-press reading in the present invention.

Figure 2:
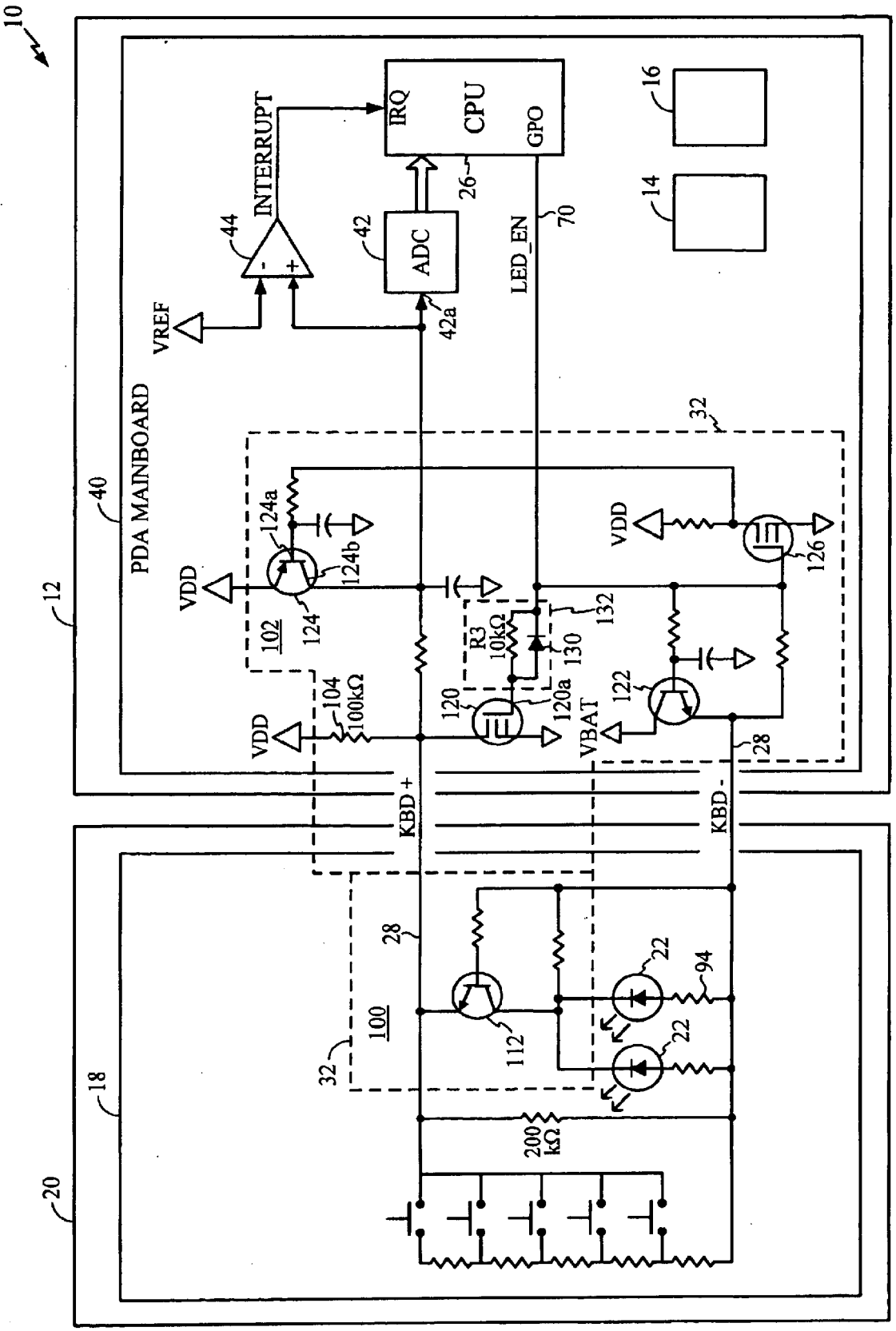
FIG. 2 illustrates an exemplary embodiment of the voltage switch in use in the mobile communications device.

FIG. 2 illustrates an exemplary embodiment of the voltage switch 32 in use in the mobile communications device 10. The voltage switch 32 preferably includes multiple switches, such as multiple transistors, that provide reliable on and off states, such as MOSFET, JFET, or BJT transistors. A first portion 100 of the voltage switch 32 may be resident on the keyboard module 18, and a second portion 102 may be resident on the mainboard 40. The two portions 100, 102 of the voltage switch 32 may then be connected by the two-wire interface 28 to form the voltage switch 32.

A first switch 112 forming part of the voltage switch 32 may be included on the keyboard module 18. The first switch 112 preferably controls the activation of the at least one light 22 according to commands from the CPU 26. In the embodiment shown, the at least one light 22 includes two LEDs in parallel. The first switch 112 is off as long as voltage KBD plus is greater than voltage KBD minus. When the voltage on KBD minus rises above the voltage on KBD plus, the first switch 112 is activated, thereby allowing current to flow through the LEDs 22 and the LED bias resistors 94. Current flow through the LEDs 22 activates the LEDs 22, thereby causing a back-lighting of the flip module 20. However, even when the LEDs 22 are in the off state, the LEDs 22 can act as photodetectors, (i.e. the LEDs 22 emit current due to ambient or other light), but the first switch 112, when in the off state, prevents LED photodetection current flow from interfering with the reading of key presses. Furthermore, when the first switch 112 is off, the first switch 112 prevents any current leakage back through the LED's 22, which leakage current might incorrectly activate the LEDs 22 and thereby cause false key press readings.

Due to the fact that it is desirable that noise not interfere with the reading of key presses by the CPU 26, the present invention isolates the backlighting of the LED mode of the CPU 26 from the reading of a key press mode of the CPU 26, by reversing polarity on the KBD terminals in each mode, respectively, as discussed hereinbelow. In order to perform this isolation of the reading of the key presses from the activation of the LED backlighting from view by the ADC 42 and the CPU 26, a positive voltage between KBD plus and KBD minus causes the isolation of the LEDs 22 from the view of the ADC 42 and the CPU.

When the LEDs 22 are in the off state, first switch 112 is inactive. Consequently, voltage KBD plus is pulled to VDD through a resistive load 104, such as the 100 kΩ resistor shown, when the LEDs 22 are off. Furthermore, when the LEDs 22 are in the off state, the CPU control line 70, LED enable (LED_EN), is low, i.e. the LEDs 22 are not enabled, and switches 120, 122, 124 and 126 remain in the off position. Additionally, it should be noted that both the first switch 112 and the LEDs 22 shown in FIG. 1 are oriented in a direction opposite to the Darlington/LED configuration historically used. The placement of the anode of the LEDs 22 on node KBD−, and the cathode to the first switch 112, allows for a reversal of polarity in the present invention, which polarity inversion is not available in the historically used Darlington switch configuration.

When the CPU 26 sends the signal to place LED enable in a high state, switches 120, 122, 124 and 126 are turned on. For example, the activation of LED enable turns on second switch 126, which in turns activates third switch 124, because the base 124a of second transistor 124 is drawn low and the collector 124b of second transistor 124 goes high, as shown. This causes the ADC 42 to see approximately VDD, and the comparator 44 connected to ADC 42 to also see approximately VDD. Additionally, the activation of switches 120, 122, 124 and 126 prevents the comparator 44 and the ADC 42 from seeing the inversion of the KBD node voltage on the two wire interface 28, as the voltage at the positive terminal of the comparator 44 is driven to VDD, thus averting an unwanted assertion of the CPU interrupt. If the comparator 44 sees the inversion of the KBD voltage, the interrupt to the CPU 26 would be activated, and maintained active for the entire time that the LED_EN signal 70 was active, thereby hindering system performance and preventing other components on the mainboard from sharing the same CPU interrupt signal. The mainboard detects whether the flip module is open or closed using a second comparator connected to the KBD plus signal. When the flip is open, KBD plus is pulled to approximately VDD. When the flip is closed, the voltage on KBD plus varies between 0 volts and VDD, multiplied by the divider formed by the 100 kOhm pullup resistor 104, and the 200 kOhm pulldown resistor on the flip module. This divider can be increased or decreased in order to fit product requirements. In a preferred embodiment, the divider ratio is 0.6875. This ratio provides sufficient signal to noise ratio for accurate key press voltage readings, and additionally enables the use of a single PNP transitor, rather than the comparator, to detect whether the flip is open or closed.

Alternatively, if increased signal to noise is desired, or if additional keys are added to the flip module, the voltage divider ratio may be increased to a value approaching unity. Doing so may increase the key press voltage range to slightly less than VDD. However, this increase necessitates use of a comparator, rather than of a PNP transistor, to detect the flip state, due to the fact that higher switching precision is required to distinguish between voltages in the flip open and flip closed states in this design.

Fourth switch 120, which may be, for example, MOSFET 120, is turned on when the LEDs 22 are turned on, as the last event of the sequence of LED activation. The activation of fourth switch 120 pulls node KBD plus to ground. However, in order to block ADC 42 from seeing the change in KBD plus, as discussed hereinabove, the third switch 124, such as PNP transistor 124, is activated prior to the activation of fourth switch 120, in order to pull the ADC 42a input up to VDD. This maintains ADC 42 in a high state, in which high state the ADC 42 cannot see that KBD plus has reached zero.

Fifth switch 122, such as bipolar junction transistor 122, introduces a positive voltage onto node KBD minus. When activated, fifth switch 122 opens a channel from VBAT to KBD minus, thereby completing the inversion of the voltage on the KBD nodes. The addition of a resistor between, for example, the collector of fifth switch 122 and VBAT may substantially reduce power dissipation in switch 122. Third switch 124 must be activated before fifth switch 122, to prevent KBD plus from reaching zero before third switch 124 can be activated. Fifth switch 122 also functions as a rudimentary voltage regulator preventing backlight flicker due to unregulated battery voltage.

Figure 3:
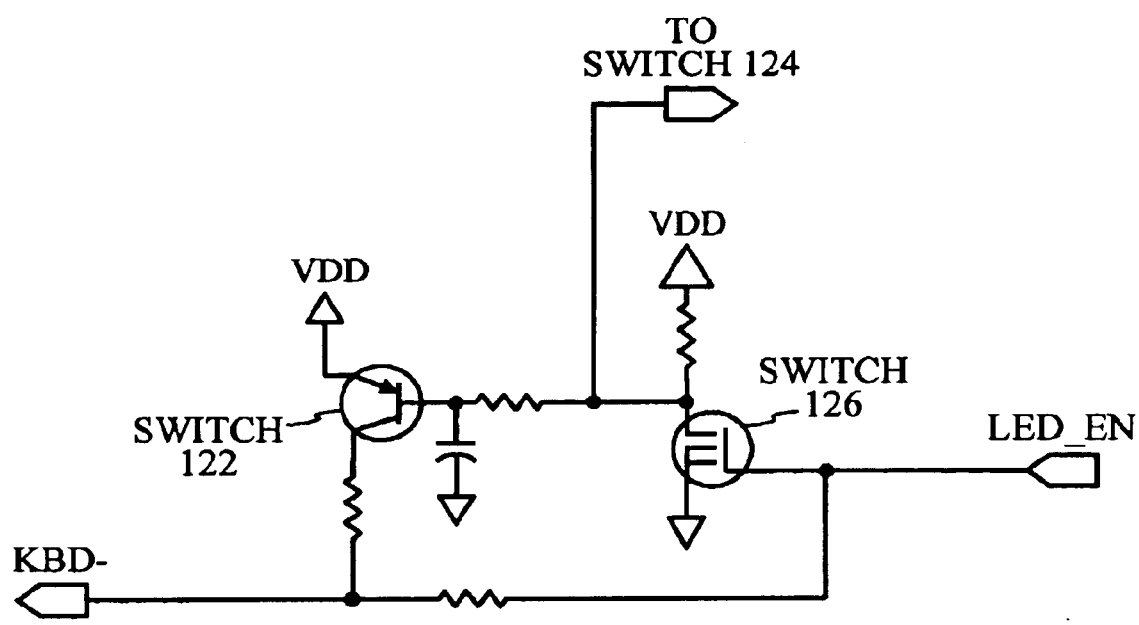
FIG. 3 shows an alternate embodiment for performing switching.

An additional embodiment of switching in the present invention is illustrated in FIG. 3. The embodiment of FIG. 3, with respect to switches 122 and 126, enables the driving of the LED backlighting by a higher voltage. However, this increase in backlight driving voltage may increase the loading on VDD, thus increasing the cost of power supplied.

Returning now to FIG. 2, when LED enable is turned off, fourth switch 120 is deactivated, and KBD plus no longer has a path to ground. Thus, fourth switch 120 immediately begins to charge toward VDD. A short time later, third switch 124 is deactivated, thus preventing the ADC 42 from seeing the LED event. Likewise, the comparator 44 is blocked from seeing the LED event.

In a preferred embodiment, a diode 130 is placed on the gate 120a of fourth switch 120. This diode 130 allows fourth switch 120 to turn off faster than it turns on, due to the fact that the sequence of the activation of fourth switch 120 is important to the operation of the present invention, as discussed hereinabove. To further aid in the controlling of the speed at which fourth switch 120 deactivates, R3, such as a 10 kΩ resistor, is provided as a filter that lowers the signal on the gate 120a of fourth switch 120 on the rising edge of the signal, but, on the falling edge of the signal, allows current to pass through the diode 130 to turn off fourth switch 120 more quickly. An activation speed control circuit 132 such as this may be used on any one or all of the switches used in the present invention, to thereby control activation speeds and insure proper operation.

It must be noted that switches 120, 122, 124 and 126 are preferably transistor switches, although any other type of switch known to those skilled in the art may be used in conjunction with the present invention. Further, transistors 120, 122, 124 and 126 may be any type of transistors, such as PNP, NPN, MOSFET, or JFET, capable of performing under the conditions of the present invention, so long as each transistor provides an activation portion, such as a base or gate, respectively, and a current path, such as emitter-collector or source-drain, respectively. Certain types of transistors, such as those shown in FIG. 2, may be preferably used for certain particular switches 120, 122, 124 and 126, based on activation speed, activation biasing, and reliability, and the desirability of using particular transistor types for each of switches 120, 122, 124 and 126 will be apparent to those skilled in the art.

Figure 4:
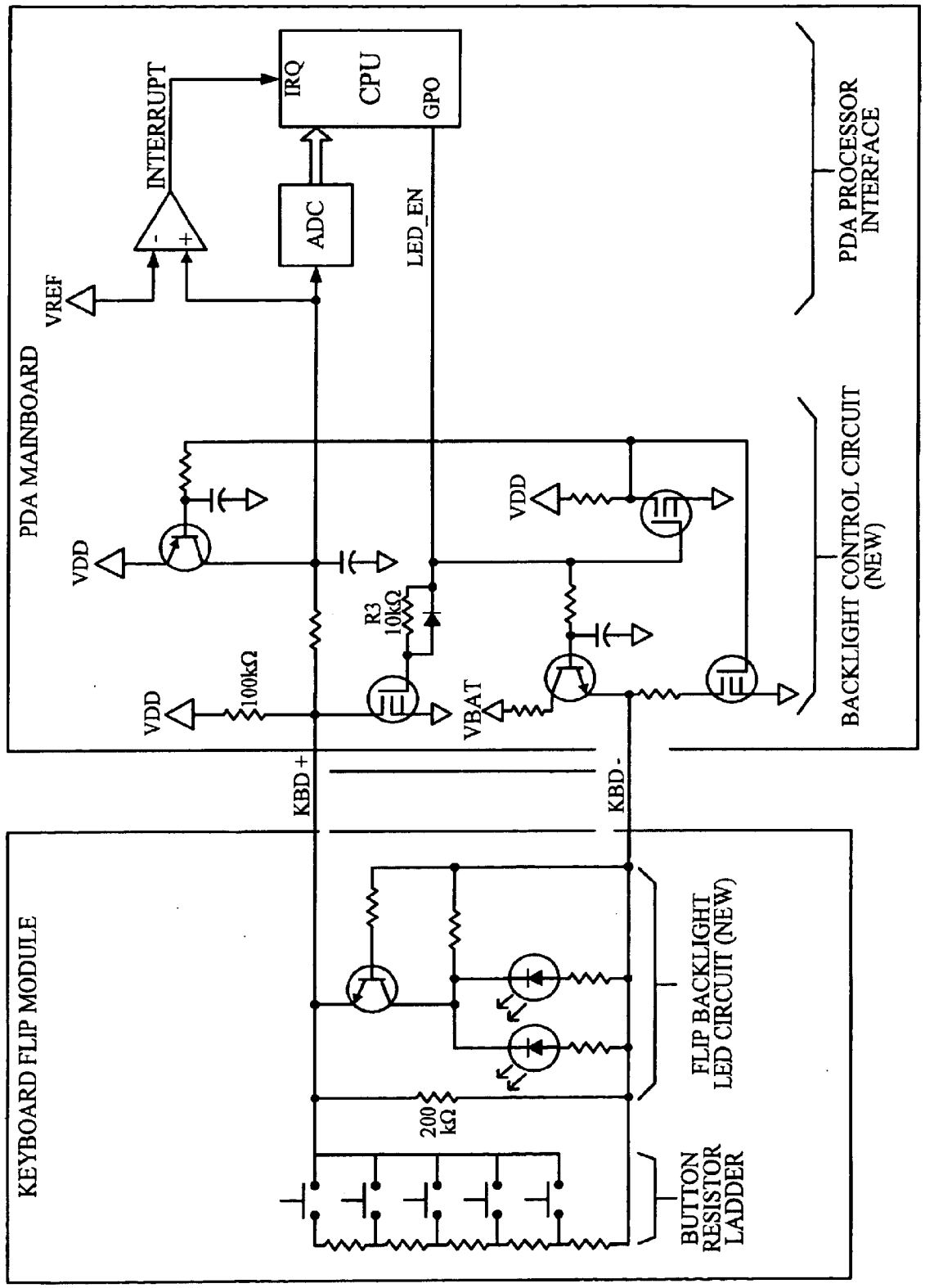
FIG. 4 illustrates a further exemplary embodiment.

FIG. 4 is a schematic diagram illustrating an additional embodiment of the present invention. It will be noted, with respect to FIG. 4, that an additional switch may be provided to improve the grounding of KBD minus. Additionally, a comparator may be included in the present invention to detect the open or closed status of the flip. This comparator may be, for example, a low-cost transistor.

Those of ordinary skill in the art will recognize that many modifications and variations of the present invention may be implemented. The foregoing description and the following claims are intended to cover all such modifications and variations.

What is claimed is:

1. A mobile communication device comprising:
   a main module having a call receiver and a call sender;
   a keyboard module resident on a flip module separate from said main module, wherein said keyboard module includes thereon a plurality of marked keys, which plurality of marked keys are backlit by at least one light;
   a central processing unit which controls activation of the at least one light;
   a two wire interface having a first voltage line and a second voltage line, wherein said two wire interface interconnects said flip module and said main module;
   a voltage switch which places a first positive voltage between the first voltage line and the second voltage line on said two wire interface to allow for reading of a pressed at least one of the plurality of keys by said central processing unit, and which places a first negative voltage between the first voltage line and the second voltage line of said two wire interface to activate the at least one light according to a command from said CPU.

2. A mobile communication device of claim 1 where the polarities of the voltages on said first voltage line and said second voltage line are reversed.

3. The mobile communication device of claim 1, wherein the call sender sends and the call receiver receives at least one connection selected from the group consisting of a telephone call, an IP telephony call, a page, a short message, data packets sent or received via a wireless data network and data packets sent or received via an infrared communication link.

4. The mobile communication device of claim 3, wherein said main module includes a main board.

5. The mobile communication device of claim 4, wherein the mainboard includes thereon the call sender and the call receiver.

6. The mobile communication device of claim 4, wherein the main board comprises a personal digital assistant.

7. The mobile communication device of claim 1, wherein the mainboard includes thereon said central processing unit, an analog to digital converter connected to said central processing unit, and a comparator having a first comparator input connected to an ADC input, a second comparator input connected to a reference voltage, and a comparator output connected to an interrupt of said central processing unit, wherein the comparator output interrupts said central processing unit upon placement of the first negative voltage by said voltage switch.

8. The mobile communication device of claim 1, wherein the plurality of keys, when pressed, cause a performance of at least one function by the communication device.

9. The mobile communication device of claim 1, wherein said keyboard module includes a resistive ladder, which resistive ladder represents each of the plurality of keys on said keyboard module with a different resistance.

10. The mobile communication device of claim 1, wherein the CPU command is passed via a CPU output line.

11. The mobile communication device of claim 10, wherein the CPU command is generated by the CPU according to a CPU multiplying routine.

12. The mobile communication device of claim 1, wherein the first negative voltage is active a majority of time.

13. The mobile communication device of claim 1, wherein said voltage switch comprises a keyboard flip module switch and a main board switch connected by said two wire interface.

14. The mobile communication device of claim 13, wherein said keyboard flip module switch comprises a transistor, and wherein an activation portion of said transistor is connected through a resistance to the first negative voltage line, and wherein a current path exists through said transistor from the first positive voltage line to at least one cathode of the at least one light.

15. The mobile communication device of claim 14, wherein the activation portion of said keyboard flip module switch is activated by the first negative voltage.

16. The mobile communication device of claim 14, wherein an at least one anode of the at least one light is connected through a resistance to the first negative voltage line.

17. The mobile communication device of claim 14, wherein said main board switch isolates said CPU from activation of the at least one light.

18. The mobile communication device of claim 13, wherein said mainboard switch comprises at least two switches.

19. The mobile communication device of claim 18, wherein at least one of the at least two switches is a mainboard transistor having an activation portion.

20. The mobile communication device of claim 19, wherein each mainboard transistor is selected from the group consisting of a PNP BJT, and NPN BJT, a MOSFET, and a JFET.

21. The mobile communication device of claim 19, wherein an activation speed and a deactivation speed of at least one mainboard transistor is controlled by a speed control circuit.

22. A method of reading key presses and backlighting a mobile communication device, comprising:
providing a main module having a call receiver and a call sender;
providing a keyboard module resident on a flip module separate from the main module, wherein the keyboard module includes thereon a plurality of marked keys,
backlighting the plurality of keys by at least one light;
controlling, by a central processing unit, of activation of the at least one light;
interconnecting the flip module and the main module using a two wire interface having a first voltage line and a second voltage line;
receiving a first switch command from the CPU;
switching to a first positive voltage between the first voltage line and the second voltage line according to said receiving the first switch command;
reading of a pressed at least one of the plurality of keys by the central processing unit upon said switching to the first positive voltage;
receiving a second switch command from the CPU;
switching to a first negative voltage between the first voltage line and the second voltage line according to said receiving the second switch command;
activating the at least one light upon said switching to the first negative voltage.

23. The method of claim 22, further comprising sending by the call sender of at least one call type selected from the group consisting of a telephone call, an IP telephony call, a page, a short message, and an IR communication call.

24. The method of claim 22, further comprising receiving by the call receiver of at least one call type selected from the group consisting of a telephone call, an IP telephony call, a page, a short message, and an IR communication call.

25. The method of claim 22, further comprising:
providing a comparator;
interrupting, by the comparator, of the central processing unit upon said switching of the first negative voltage.

26. The method of claim 22, further comprising performing, by the CPU, of at least one function upon a pressing by a user of at least one of the plurality of keys.

27. The method of claim 22, further comprising generating, by the CPU, of the first switch command and the second switch command using a CPU multiplying routine.

28. The method of claim 22, wherein the at least one light comprises at least one diode, further comprising connecting at least one anode of the at least one light through a resistance to the first negative voltage line.

29. The method of claim 22, further comprising isolating the CPU from said backlighting.

30. The method of claim 22, further comprising controlling an activation speed and a deactivation speed of said switching to the first positive voltage by at least one speed control circuit.

31. The method of claim 22, further comprising controlling an activation speed and a deactivation speed of said switching to the first negative voltage by at least one speed control circuit.

32. A method of reading key presses and backlighting a mobile communication device, comprising:

provided a mobile communication device including a plurality of marked keys on a flip module separate from a main module;

switching, by the mobile communication device, between a first positive voltage to the flip module when the plurality of marked keys are backlit, and a first negative voltage when the plurality of marked keys are not backlit, according to a switch command from the main module.

33. A mobile communication device comprising:

a main module;

a flip module electrically connected by a two wire interface to said main module, wherein said flip module includes thereon a plurality of marked keys;

a voltage switch which places a first positive voltage on the two wire interface to allow for a reading of a pressed at least one of the plurality of keys by said main module, and which places a first negative voltage on the two wire interface to prevent the reading of a pressed at least one of said plurality of keys by said main module.

34. The mobile communication device of claim 33, further comprising a back light on said flip module, which backlight is active during placement of the first negative voltage.

35. A mobile communication device, comprising:

a main module having a call receiver and a call sender;

a keyboard module resident on a flip module separate from said main module, wherein said keyboard module includes thereon a plurality of marked keys, means for backlighting the plurality of keys;

means for controlling activation of said means for backlighting;

means for interconnecting said flip module and said main module;

means for switching that places a first positive voltage on said means for interconnecting to allow for a reading, by said main module, of a pressed at least one of the plurality of keys, and which places a first negative voltage on said means for interconnecting to prevent the reading, by said main module, of a pressed at least one of the plurality of keys.

* * * * *